US010272840B2

(12) United States Patent
Schmahl et al.

(10) Patent No.: US 10,272,840 B2
(45) Date of Patent: Apr. 30, 2019

(54) COMMUNICATION DEVICE FOR A VEHICLE

(71) Applicants: Karen Schmahl, Fairfield, OH (US); Robert L Hart, Cincinnati, OH (US)

(72) Inventors: Karen Schmahl, Fairfield, OH (US); Robert L Hart, Cincinnati, OH (US)

( * ) Notice: Subject to any disclaimer, the term of this patent is extended or adjusted under 35 U.S.C. 154(b) by 0 days.

(21) Appl. No.: 16/114,115

(22) Filed: Aug. 27, 2018

(65) Prior Publication Data

US 2018/0361937 A1 Dec. 20, 2018

Related U.S. Application Data

(60) Provisional application No. 62/553,001, filed on Aug. 31, 2017.

(51) Int. Cl.
| | | |
|---|---|---|
| *B60R 1/12* | (2006.01) | |
| *B60R 11/02* | (2006.01) | |
| *B60R 11/00* | (2006.01) | |

(52) U.S. Cl.
CPC .......... *B60R 1/12* (2013.01); *B60R 11/0217* (2013.01); *B60R 11/0235* (2013.01); (Continued)

(58) Field of Classification Search
CPC .......... H04N 5/04; H04N 5/232; H04N 5/247; H04N 5/77; H04N 5/92; H04N 5/9201; H04N 5/9202; H04N 5/932; H04N 5/23219; B60W 10/04; B60W 10/20; B60W 30/18; B60W 30/1863; B60R 1/12; B60R 16/023; B60R 2001/1215; B60R 2001/1253; B60R 2001/1276; B08B 13/19645; B08B 13/19647; B08B 13/19652; G06K 9/00; G06K 9/00718; G06K 9/00798; G06K 9/00805; G06K 9/00825; G06K 9/000818; G06K 9/00898

See application file for complete search history.

(56) References Cited

U.S. PATENT DOCUMENTS

| | | | | |
|---|---|---|---|---|
| 7,062,049 B1 * | 6/2006 | Inoue | .................... | G10K 11/178 381/71.4 |
| 8,718,797 B1 * | 5/2014 | Addepalli | ............. | H04W 4/046 700/17 |

(Continued)

*Primary Examiner* — Van T Trieu
(74) *Attorney, Agent, or Firm* — Barry Choobin; Patent 360

(57) ABSTRACT

The present invention discloses a two-way communication device for vehicles to communicate with an external environment of the vehicle. The communication device comprises a first communication device and a second communication device. The first communication device is adapted to be mounted on an interior of the vehicle. The first communication device comprises at least one interior speaker, microphone and a display. The second communication device adapted to be mounted on an exterior surface of the vehicle. The second communication device comprises at least one interior audio speaker, a microphone and a camera lens. The first communication device and second communication device are communicated via a signal processing circuit. The signal processing circuit is configured to broadcast audio, and videos of the external environment via first communication device within the vehicle.

15 Claims, 4 Drawing Sheets

(52) U.S. Cl.
CPC ... *B60R 11/0247* (2013.01); *B60R 2001/1253* (2013.01); *B60R 2001/1276* (2013.01); *B60R 2011/004* (2013.01); *B60R 2011/0028* (2013.01); *B60R 2011/0033* (2013.01)

(56) References Cited

U.S. PATENT DOCUMENTS

| | | | |
|---|---|---|---|
| 2004/0121645 A1* | 6/2004 | Postrel | H04B 1/082 439/374 |
| 2009/0273673 A1* | 11/2009 | Worley | B60R 25/102 348/148 |
| 2016/0295308 A1* | 10/2016 | Battyanyi | H04R 1/028 |
| 2017/0251163 A1* | 8/2017 | Ochiai | H04N 5/232 |

* cited by examiner

COMMUNICATION DEVICE FOR A VEHICLE

BACKGROUND OF THE INVENTION

A. Technical Field

The present invention generally relates to a communication device for vehicles. More specifically, the present invention relates to a two-way communication device for vehicles, allowing one or more passengers/occupants to communicate from, or to one or more outsiders in the external environment of the vehicle.

B. Description of Related Art

Generally, vehicles are being equipped with entertainment systems and devices that provide audio and video media in the mobile settings. Vehicles are commonly equipped with a variety of video displays, audio receivers and speakers within a passenger compartment to provide entertainment such as mobile facilities, movies, television, radio and music. The audio speakers typically employed within the passenger compartment of the vehicle provides audio within the vehicle, while a microphone may be employed to pickup driver spoken commands, such as for use in a navigation system or telephone system.

Currently, the driver within the vehicle, faces difficulty to communicate with a person outside of the vehicle such as for ordering food at a drive-through ordering window at a restaurant, tailgating, public address announcements. In order to do so, the driver or a person/passenger within the vehicle has to roll down the window or open a door of the vehicle. However, this may pose a risk for vehicle security and subject the passenger compartment to adverse environmental conditions like rainy weather. In some restaurants, the driver or passenger has to get out of the vehicle for ordering the food, or even for better audible communication to the outsiders in a traffic jam. Further, known communication devices are not providing proper communication between the outside environment and the driver or passengers within the vehicle. Due to the lack of communication from outside environment, the driver could fail to receive public-address announcements or any traffic patrol warnings.

Accordingly, it is therefore desirable to provide for a communication device that enables drivers or passengers within a vehicle to communicate with the outside environment. In particular, it is desirable to provide a communication device that enables the vehicle driver or passenger to provide audio from the vehicle to the outside environment in a manner that is easy to use, cost-effective and poses a lessened threat to security and exposure to undesirable environmental conditions outside the vehicle. It is also desired to provide a communication device that enables a vehicle passenger to effectively receive sound from outside the vehicle. It is further desired to provide a communication device with an external monitoring device for a vehicle capable of effectively capturing the vehicle external images/videos in real-time by placing the camera in position.

SUMMARY OF THE INVENTION

The present invention generally discloses an audio communication device for vehicles. The present invention directed to a two-way communication device for vehicles, allowing users or persons to communicate from or to an external environment of the vehicle.

In an embodiment, the two-way communication device for a vehicle, comprises a first communication device and a second communication device. The first communication device is disposed within a body defining a passenger compartment of the vehicle. The first communication device is adapted to be mounted on an interior of the vehicle. The first communication device comprises at least one interior speaker, microphone and a display. Then, at least one interior audio speaker, at least one interior microphone and display of the first communication device could be disposed elsewhere within the passenger compartment of the vehicle.

In one embodiment, the at least one interior speaker located in the passenger compartment of the vehicle and adapted to broadcast sound in the passenger compartment captured by the exterior microphone. The at least one interior microphone of the first communication device adapted to capture audio from one or more passengers within the vehicle and to communicate the audio sound to the outside environment via the speaker. In one embodiment, the display located in the passenger compartment of the vehicle and adapted to broadcast images and videos in the passenger compartment captured by the exterior camera lens.

In one embodiment, the second communication device disposed on an exterior surface of the vehicle. The second communication device comprises a housing adapted to be mounted on the exterior surface of the vehicle. The housing includes at least a first provision, a second provision and a third provision. In one embodiment, the first provision is configured to secure an exterior audio speaker. The exterior audio speaker is configured to provide audio to the external environment of the vehicle.

In one embodiment, the second provision is configured to secure an exterior microphone by an adhesive or a fastening mechanism. The exterior microphone is configured to receive audio signals from the external environment proximity to the vehicle.

In one embodiment, the third provision is configured to secure a camera lens by an adhesive or a fastening mechanism. The camera lens or the second communication is configured to capture images or videos of the external environment proximity to the vehicle.

In one embodiment, a plurality of communication links coupled to the first communication device and second communication device for communicating audio and video signals. In one embodiment, the first communication device and second communication device are communicated via a signal processing circuit. The signal processing circuit configured to broadcast audio and videos of the external environment, via the second communication device within the vehicle, to one or more occupants inside the vehicle.

In one embodiment, the communication device is incorporated to a wing mirror of the vehicle by an adhesive or a fastening mechanism. In another embodiment, the communication device is incorporated to a door panel of the vehicle by an adhesive or a fastening mechanism. In some embodiments, the communication device is incorporated to an exterior surface of the vehicle but not limited to a roof panel of the vehicle.

In one embodiment, the two-way communication device further comprises an input control, configured to control the first and second communication devices. In one embodiment, the communication device includes a water resistance transparent cover to protect from adverse environmental conditions like rainy or snowy weather. The communication device is also could be retro-fitted to the existing vehicles, or it could be integrated/in-built to the newly manufactured vehicles. The two-way communication device is configured allow the driver or passengers to communicate from or to an external environment of the vehicle.

In another embodiment, the first communication device could be a smart phone, a tablet, a PDA, a smart watch, a laptop, or any other computing and telecommunication devices. Further, the first communication device could be integrated or in communication with the second communication device via a wireless communication network. In one embodiment, the wireless communication network could be Wi-Fi, WLAN, infrared, and Bluetooth.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1A:
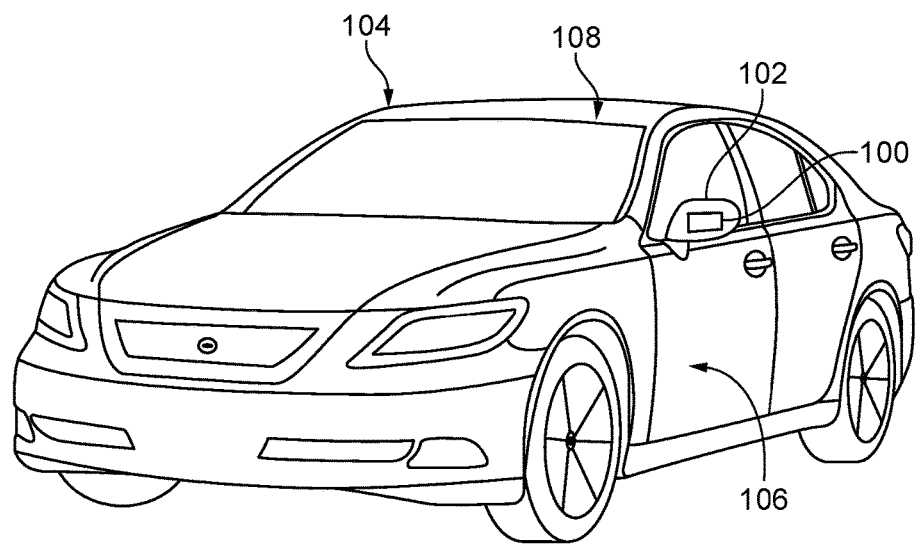
FIG. 1A exemplary shows a perspective view of an exterior wing mirror assembly of a vehicle equipped with a communication device in one embodiment of the present invention.

Referring to FIG. 1A, the perspective view of a vehicle 104 having a wing mirror 102 equipped with a communication device 100 is illustrated. The vehicle 104 generally having a body that includes a wing mirror 102, a door panel 106 and a roof 108. The wing mirror 102 is located on the exterior of the vehicle 104. In an embodiment, the communication device 100 is incorporated to the wing mirror 102 of the vehicle 104. In one embodiment, the communication device 100 is configured to provide communication with the external environment of the vehicle 104. In another embodiment, the communication device 100 is incorporated to the door panel 106 of the vehicle 104 by an adhesive or a fasting mechanism. In some embodiments, the communication device 100 is incorporated to the roof panel 108 of the vehicle 104 by an adhesive or a fastening mechanism. In one embodiment, the communication device 100 is comprises a first communication device 101 (shown in FIG. 1B) and second communication device 103 (shown in FIG. 2). In one embodiment, the communication device 100 includes a water resistance transparent cover to protect from adverse environmental conditions like rainy or snowy weather.

Figure 1B:
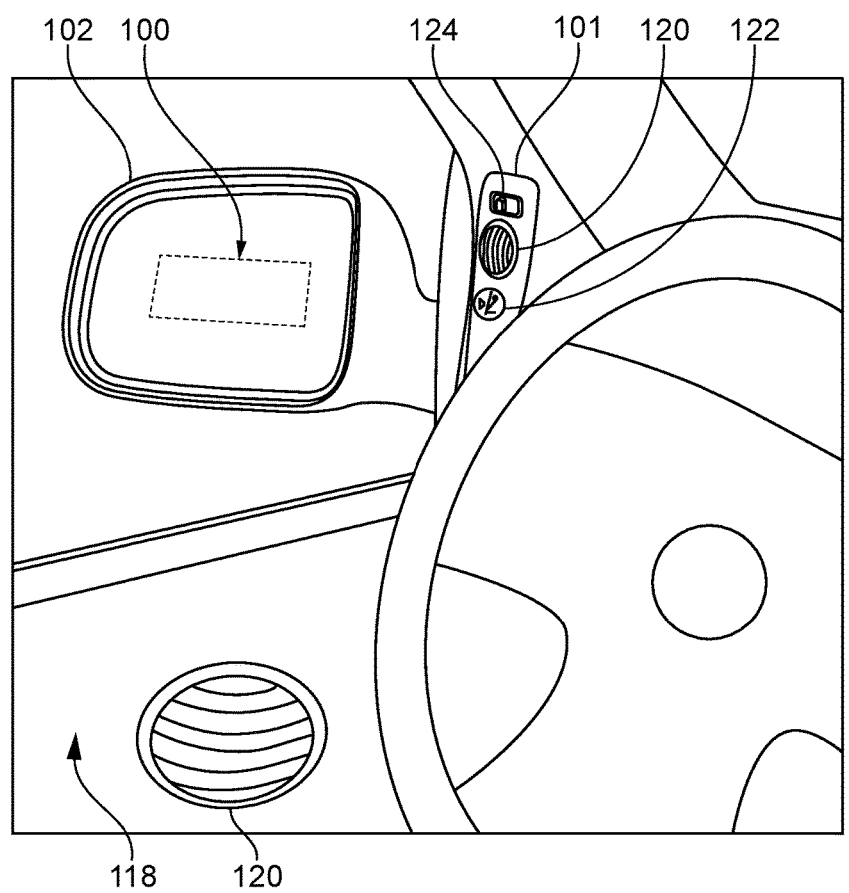
FIG. 1B exemplary shows a perspective view of a first communication device within the vehicle passenger compartment in one embodiment of the present invention.

Referring to FIG. 1B, the perspective view of a first communication device 101 within the vehicle passenger compartment 118 is illustrated. In one embodiment, the first communication device comprises at least one interior speaker 120, at least one interior microphone 122, a display 128 and an input control 124. In one embodiment, the at least one interior speaker 120 located in the passenger compartment 118 of the vehicle 104 and adapted to broadcast sound in the passenger compartment 118 captured by the exterior microphone 114 (shown in FIG. 2). The at least one interior microphone 114 (shown in FIG. 2) of the first communication device 101 adapted to capture audio from one or more passengers within the passenger compartment 118 to communicate to the outside environment via the exterior audio speaker 112 (shown in FIG. 2). In one embodiment, a display 128 (shown in FIG. 3) located in the passenger compartment 118 of the vehicle 104 and adapted to broadcast images and videos in the passenger compartment 118 captured by the exterior camera lens 116 (shown in FIG. 2). The vehicle 104 generally includes one or more interior speakers 120 and located at various compartments within the vehicle 104 for a sound system.

In one embodiment, the input control 124 is positioned within the passenger compartment 118, configured to control the interior speaker 120 and the microphone 122. The interior speaker 120, microphone 122, and input control 124 could be communication with the plurality of communication links to communicate input and output control signals. The driver or passengers/occupants of the vehicle 104 is able to select between the interior and exterior microphones and speakers by manipulating the input control 124. In one embodiment, the input control 124 is disposed on the user interface of the vehicle 104. In some embodiments, the input control 124 is could be located elsewhere such as in the steering wheel control buttons of the vehicle 104.

Figure 2:
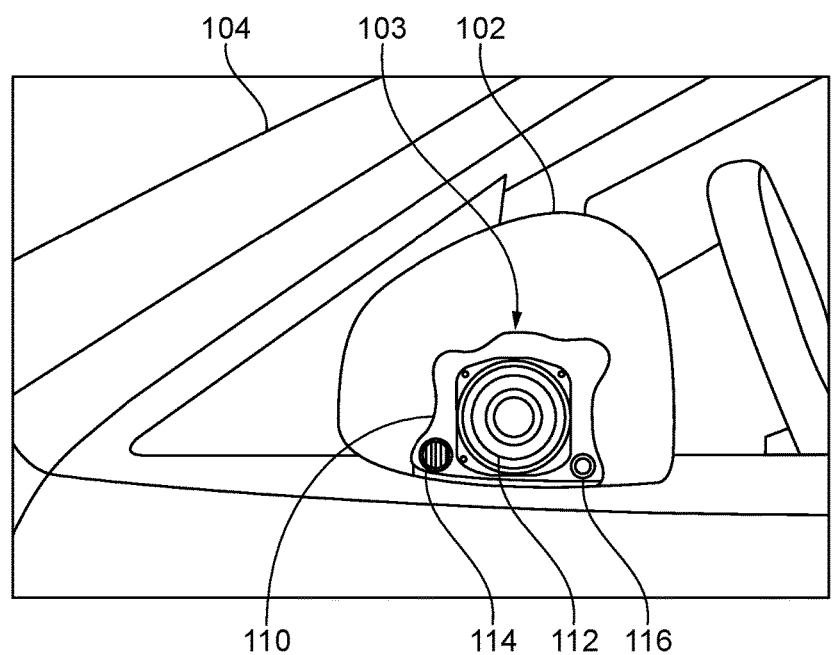
FIG. 2 exemplary shows an enlarged view of the exterior wing mirror assembly equipped with the second communication device in one embodiment of the present invention.

Referring to FIG. 2, the enlarged view of the exterior wing mirror 102 equipped with the second communication device 103 is illustrated. In one embodiment, the second communication device 103 disposed on an exterior surface of the exterior wing mirror 102. The second communication device 103 comprises a housing 110 is adapted to be mounted on an exterior surface of the wing mirror 102 of the vehicle 104. The housing 110 includes at least a first provision, a second provision and a third provision for the second communication device 103. The first provision of the housing 110 is configured to secure an audio speaker 112 by an adhesive or a fastening mechanism. The audio speaker 112 is configured to provide audio to the external environment of the vehicle 104. The second provision of the housing 110 is configured to secure a microphone 114 by an adhesive or a fastening mechanism. The microphone 114 is configured to receive audio signals from the external environment proximity to the vehicle 104. The third provision of the housing 110 is configured to secure a camera lens 116 by an adhesive or a fastening mechanism. The camera lens 116 is configured to capture images of the external environment from the vehicle 104. In one embodiment, the audio speaker 112, microphone 114 and camera lens 116, generally in communication with one or more ports presented within the housing 110. In one embodiment, the camera lens 116 could be used to capture videos/images of the external environment from the vehicle 104.

In one embodiment, the exterior audio speaker 112, microphone 114 and camera lens 116 are powered via a separate power source such as a battery, which is disposed within the vehicle. In another embodiment, the exterior audio speaker 112, microphone 114 and camera lens are powered via an internal power supply of the vehicle 104.

Figure 3:
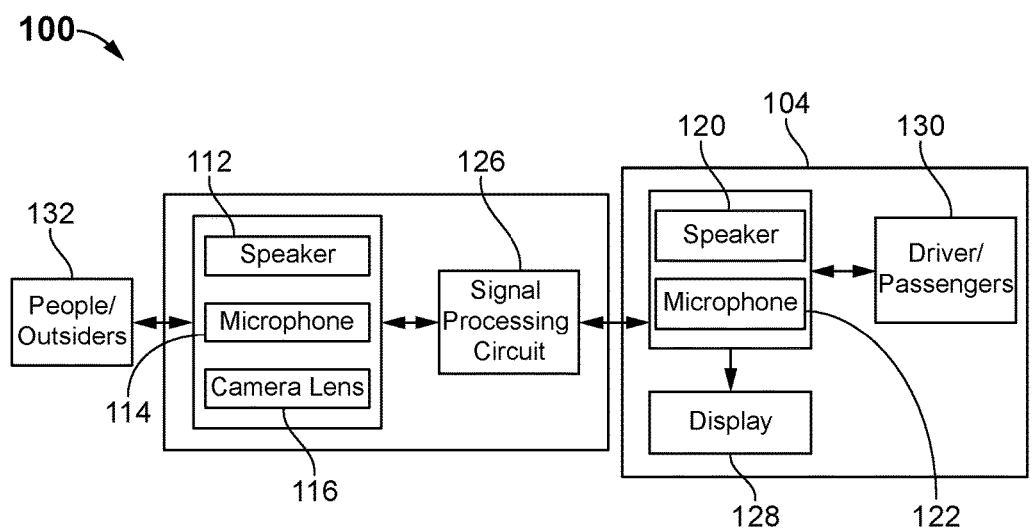
FIG. 3 exemplary illustrates a block diagram of a communication device incorporated in the vehicle in one embodiment of the present invention.

Referring to FIG. 3, the block diagram of a communication device 100 incorporated in the vehicle 118 is illustrated. The signal processing circuit 126 is communicated to at least one exterior speaker 112 and at least one exterior microphone 114 and at least one interior speaker 120 and at least one interior microphone 122. The signal processing circuit 126 includes digital circuit such as a digital processor and an analog circuit such as analog processor. The signal processing circuit 126 is configured to broadcast audio, and videos of the external environment via at least one interior speakers 120 and a display 128 within the vehicle. The signal processing circuit 126 converts the audio signals into electrical signals and vice versa. In one embodiment, the signal processing circuit 126 provides echo cancellation, voice enhancement, and noise reduction.

In one embodiment, the display 128 is incorporated to the vehicle passenger compartment. In one embodiment, the display 128 is communicated with the signal processing circuit 126 via a plurality of communication links, configured to display the external environment proximity from the vehicle 104.

The exterior audio speaker 112 and microphone 114 of the second communication device 200 incorporated within the outside wing mirror 102, allows the vehicle driver or occupant 130 to communicate with one or more persons/outsiders 132 outside of the vehicle 104 without having to roll down the window or open the door of the vehicle 104. In one embodiment, the driver or occupant/passenger 130 within the vehicle 104 could control the volume of the exterior speaker 112 by means of the user interface controls.

The exterior speaker 112 and microphone 114 may be utilized to provide a variety of enhanced audio features. In some embodiments, the exterior speaker 112 and microphone 114 could be used for an intercom system, tailgating, and allowing the owner of vehicle to enjoy the sound system at beaches, parks and parties.

In one embodiment, the exterior speaker 112 could provide additional warning, in addition to other vehicle security system. In one embodiment, the driver or occupant/passengers 130 within the vehicle 104 could order the food at drive-through ordering window without having to roll down the window or opening the door of the vehicle 104. The communication device 100 provides voice enhancement and reduces or cancels the noises in the exterior environment audio signals or within the vehicle compartment. The communication device 100 according to the present invention, provide safe communication, easy to use, cost-effective and poses a lessened threat to security and exposure to undesirable environmental conditions outside the vehicle 104. The communication device 100 is also could be retro-fitted to the existing vehicles, or it could be integrated/in-built to the newly manufactured vehicles.

A method for two-way communication, the method comprising the steps, at one step, a connection between a first communication device and the second communication device is established via the input control. At another step, a first information such as audio of the driver or passengers within the vehicle is transmitted via at least one interior microphone of the first communication device. At another step, the transmitted audio of the driver or passengers is received by people or outsiders via an exterior speaker of the second communication device. At another step, a second information such as audio or videos/images of the peoples or outsiders is transmitted via at least one exterior microphone and a camera lens of the second communication device in response to the audio of the driver or passengers within the vehicle. At another step, the transmitted audio or videos/images of the people or outsiders are received via interior speaker and the display of the first communication device within the vehicle.

In another embodiment, the first communication device 101 could be a smart phone, a tablet, a PDA, a smart watch, a laptop, or any other computing and telecommunication devices. Further, the first communication device 101 could be integrated or in communication with the second communication device 103 via a wireless communication network. In one embodiment, the wireless communication network could be Wi-Fi, WLAN, infrared, and Bluetooth.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A two-way communication device incorporated on a wing mirror of a vehicle allowing one or more passengers/occupants to communicate from, or to one or more outsiders in the external environment of the vehicle, comprising:
   a first communication device disposed within a body defining a passenger compartment of the vehicle, wherein the first device comprises:
   at least one interior audio speaker;
   at least one interior microphone;
   a display;
   wherein the at least one interior audio speaker, at least one interior microphone and display could be disposed elsewhere within the passenger compartment of the vehicle;
   a second communication device disposed on the wing mirror of the vehicle, wherein the second communication device comprising:
   a housing adapted to be mounted on the wing mirror of the vehicle, wherein the housing includes at least a first provision, a second provision and a third provision;

an exterior audio speaker positioned within the first provision of the housing;

an exterior microphone positioned within the second provision of the housing;

a camera lens positioned within the third provision of the housing;

a plurality of communication links coupled to the first communication device and second communication device for communicating audio and video signals;

wherein the first communication device and second communication device are communicated via a signal processing circuit;

wherein the communication device is configured to allow a driver or passengers within the vehicle to communicate from or to an external environment of the vehicle.

2. The device of claim 1, wherein the at least one interior speaker located in the passenger compartment of the vehicle and adapted to broadcast sound in the passenger compartment captured by the exterior microphone, which is positioned within the second provision of the housing in the wing mirror of the vehicle.

3. The device of claim 1, wherein the interior microphone adapted to capture audio from one or more passengers within the vehicle and to communicate the audio sound to the outside environment via the exterior audio speaker, which is positioned within the first provision of the housing in the wing mirror of the vehicle.

4. The device of claim 1, wherein the display located in the passenger compartment of the vehicle and adapted to broadcast images and videos in the passenger compartment captured by the exterior camera lens, which is positioned within the third provision of the housing in the wing mirror of the vehicle, and wherein the camera lens of the second communication device is configured to capture images or videos of the external environment proximity to the vehicle.

5. The device of claim 1, further comprises an input control, configured to control the first and second communication device.

6. The device of claim 1, wherein the exterior audio speaker of the second communication device is configured to provide audio to the external environment of the vehicle.

7. The device of claim 1, wherein the exterior microphone is configured to receive audio signals from the external environment proximity to the vehicle.

8. The device of claim 1, wherein the audio speaker, microphone and the camera lens of the second communication device are positioned within the first provision, second provision and the third provision by an adhesive or a fastening mechanism respectively.

9. The device of claim 1, wherein the signal processing circuit is configured to broadcast audio and videos of the external environment, via the second communication device within the vehicle, to one or more occupants inside the vehicle.

10. The device of claim 1, includes a water resistance transparent cover to protect from adverse environmental conditions.

11. The device of claim 1, is retrofittable to the existing vehicles, and integrated/in-built to the newly manufactured vehicles.

12. The device of claim 1, wherein the signal processing circuit is configured to broadcast audio, and videos/images of the external environment within the vehicle via the first communication device.

13. The device of claim 1, wherein the first communication device is one of a smart phone, a tablet, a PDA, a smart watch, and a laptop.

14. The device of claim 1, wherein the first communication device is in communication with the second communication device via a wireless communication network.

15. The device of claim 14, wherein the wireless communication network is Wi-Fi, WLAN, infrared, and Bluetooth.

* * * * *